US011836763B1

(12) United States Patent
Mendivil et al.

(10) Patent No.: US 11,836,763 B1
(45) Date of Patent: Dec. 5, 2023

(54) SYSTEMS AND METHODS FOR FACILITATING PURCHASES

(71) Applicant: United Services Automobile Association (USAA), San Antonio, TX (US)

(72) Inventors: Marty Lee Mendivil, San Antonio, TX (US); Rickey Dale Burks, Boerne, TX (US); Charles Lee Oakes, III, Boerne, TX (US); Michael Patrick Bueche, Jr., San Antonio, TX (US); Christopher A. Jackson, San Antonio, TX (US); Margaret M. Tuschinski, San Antonio, TX (US); Craig Kincaid, Floresville, TX (US); Luke James Gradeless, San Antonio, TX (US); Elizabeth Jackson, Helotes, TX (US); Stephen Basilotto, Simsbury, CT (US)

(73) Assignee: United Services Automobile Association (USAA), San Antonio, TX (US)

(*) Notice: Subject to any disclaimer, the term of this patent is extended or adjusted under 35 U.S.C. 154(b) by 469 days.

(21) Appl. No.: 16/940,755

(22) Filed: Jul. 28, 2020

Related U.S. Application Data

(63) Continuation of application No. 15/969,635, filed on May 2, 2018, now Pat. No. 10,769,681, which is a continuation of application No. 14/204,183, filed on Mar. 11, 2014, now Pat. No. 10,032,193.

(60) Provisional application No. 61/777,474, filed on Mar. 12, 2013.

(51) Int. Cl.
*G06Q 30/00* (2023.01)
*G06Q 30/0241* (2023.01)

(52) U.S. Cl.
CPC ............... *G06Q 30/0277* (2013.01)

(58) Field of Classification Search
CPC .................................. G06Q 30/0277
See application file for complete search history.

(56) References Cited

U.S. PATENT DOCUMENTS

| 6,584,451 B1 * | 6/2003 | Shoham ............ G06Q 30/0605 |
| | | 705/37 |
| 6,647,373 B1 | 11/2003 | Carlton-Foss |
| 7,024,376 B1 | 4/2006 | Yuen |
| 7,376,631 B2 | 5/2008 | King |

(Continued)

OTHER PUBLICATIONS

U.S. Appl. No. 15/969,635, filed May 2, 2018, Systems and Methods for Facililtating Purchases.

(Continued)

*Primary Examiner* — Rokib Masud
(74) *Attorney, Agent, or Firm* — Perkins Coie LLP

(57) ABSTRACT

Methods and systems for facilitating a program with participating merchants and consumers are described. In some embodiments, a method includes receiving a wish list of a user. The wish list may include items or services sold by merchants participating in the program. The wish list may be published to the merchants participating in the program. A location of the user may be determined, and an offer from one of the participating merchants may be received, where the offer is based on the location of the user. A total cost of the offer may be calculated by analyzing the offer. The user may be notified of the offer and the total cost.

20 Claims, 9 Drawing Sheets

(56) References Cited

U.S. PATENT DOCUMENTS

| | | | |
|---|---|---|---|
| 7,472,074 B1* | 12/2008 | Walker | G06Q 40/04 |
| | | | 705/26.82 |
| 7,917,404 B2 | 3/2011 | Egashira | |
| 7,996,298 B1 | 8/2011 | Catane | |
| 8,655,746 B1 | 2/2014 | Mussman | |
| 10,032,193 B1 | 7/2018 | Mendivil et al. | |
| 2002/0147674 A1 | 10/2002 | Gillman | |
| 2003/0200152 A1 | 10/2003 | Divekar | |
| 2003/0225685 A1* | 12/2003 | Dickerson | G06Q 20/10 |
| | | | 705/38 |
| 2004/0138986 A1 | 7/2004 | Petrovich | |
| 2004/0249723 A1* | 12/2004 | Mayer | G06Q 30/0601 |
| | | | 705/26.61 |
| 2005/0065853 A1 | 3/2005 | Ferreira | |
| 2005/0108144 A1 | 5/2005 | Longman | |
| 2006/0059023 A1 | 3/2006 | Mashinsky | |
| 2006/0109964 A1 | 5/2006 | Skelton | |
| 2006/0200152 A1 | 6/2006 | Brzezniak | |
| 2007/0073593 A1 | 3/2007 | Perry | |
| 2007/0150369 A1 | 6/2007 | Zivin | |
| 2008/0097927 A1 | 4/2008 | Renzi | |
| 2009/0030833 A1 | 1/2009 | Leung | |
| 2009/0216655 A1 | 8/2009 | Nguyen | |
| 2011/0029360 A1* | 2/2011 | Gollapalli | G06Q 30/02 |
| | | | 705/14.1 |
| 2013/0046648 A1 | 2/2013 | Calman | |
| 2014/0025526 A1 | 1/2014 | Cavanaugh | |
| 2014/0100991 A1 | 4/2014 | Lenahan | |
| 2015/0178778 A1 | 6/2015 | Lee | |
| 2017/0061535 A1* | 3/2017 | Williams | G06Q 20/102 |

OTHER PUBLICATIONS

U.S. Appl. No. 14/204,183, U.S. Appl. No. 10,032,193, filed Mar. 11, 2014, Jul. 24, 2018, Systems and Methods for Facilitating Purchases.

U.S. Appl. No. 61/777,474, filed Mar. 12, 2013, Systems and Methods for Facilitating Purchases.

* cited by examiner

SYSTEMS AND METHODS FOR FACILITATING PURCHASES

CROSS-REFERENCE TO RELATED APPLICATIONS

This application is a continuation of U.S. patent application Ser. No. 15/969,635, filed May 2, 2018, entitled "SYSTEMS AND METHODS FOR FACILITATING PURCHASES," now allowed, which is a continuation of U.S. patent application Ser. No. 14/204,183, filed Mar. 11, 2014, entitled "SYSTEMS AND METHODS FOR FACILITATING PURCHASES", now U.S. Pat. No. 10,032,193, issued Jul. 24, 2018, which claims priority to U.S. Provisional Application No. 61/777,474, filed Mar. 12, 2013, entitled "REVERSE AUCTION," all of which are hereby incorporated by reference in their entireties for all purposes.

TECHNICAL FIELD

Various embodiments of the present disclosure generally relate to facilitating purchases. More specifically, various embodiments relate to systems and methods for facilitating purchases.

BACKGROUND

Consumers often spend valuable time shopping at various merchants for the best deal on an item or service for purchase. Merchants often advertise to consumers without specifically knowing what the consumer is interested in purchasing. Accordingly, both consumers and merchants would benefit from a system that allows a merchant insight into a consumer's specific needs and provides the consumer with the best deal for the consumer.

SUMMARY

In some embodiments, a method includes receiving a wish list of a user, where the wish list includes items or services sold by merchants participating in a reverse auction program. The method may further include publishing the wish list to the merchants participating in the reverse auction program, identifying a location of the user, and receiving one or more offers from at least one of the merchants participating in the reverse auction program. The method may further include analyzing the one or more offers to calculate a total cost of each of the one or more offers and notifying the user of the one or more offers and the total cost of the one or more offers.

Upon receiving acceptance of one of the one or more offers, a purchase may be completed with a merchant whose offer was accepted. The one or more offers may include an offer for more than one item or service on the wish list. The method may include publishing the one or more offers from the at least one of the merchants participating in the reverse auction program. Funds may be deposited into an escrow account for the user in accordance with a price or total cost the user is willing to pay for each item listed on the wish list.

The total cost of each of the one or more offers may include a price of the item or service, a cost of delivery of the item or service, and a cost of time to the user. The method may further include aggregating wish lists associated with at least two users to negotiate on behalf of the at least two users.

Computer-readable mediums that recite instructions similar to the method steps are discussed. Further, systems including components that are configured to accomplish the steps recited in the method are also discussed.

While multiple embodiments are disclosed, still other embodiments will become apparent to those skilled in the art from the following detailed description, which shows and describes illustrative embodiments. As will be realized, embodiments of the present disclosure are capable of modifications in various aspects, all without departing from the scope of the present disclosure. Accordingly, the drawings and detailed description are to be regarded as illustrative in nature and not restrictive.

BRIEF DESCRIPTION OF THE DRAWINGS

Embodiments of the present disclosure will be described and explained through the use of the accompanying drawings in which.

Figure 1:
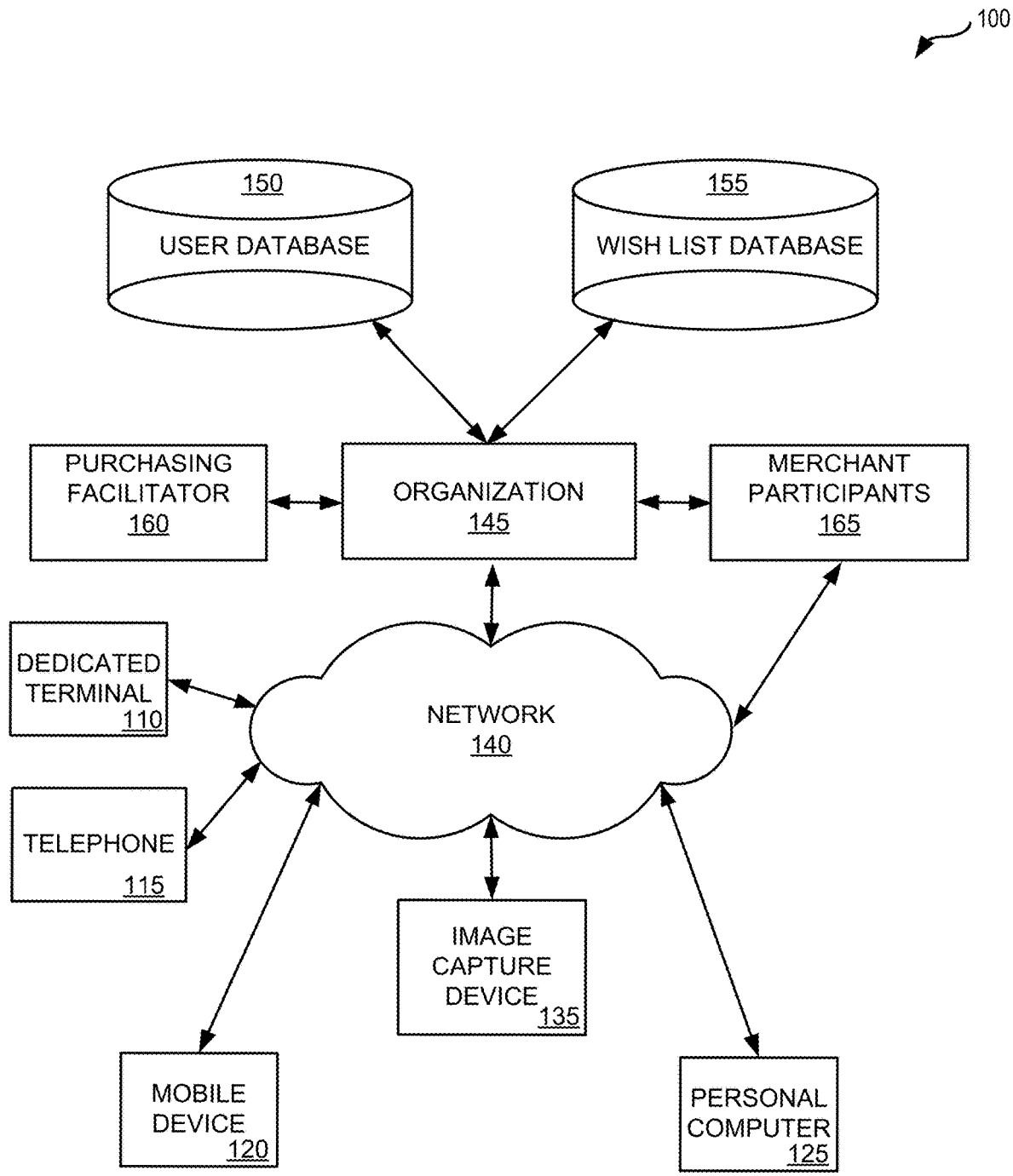
FIG. 1 illustrates an example of an operating environment in which some embodiments of a purchasing facilitator may be utilized.

The drawings have not necessarily been drawn to scale. For example, the dimensions of some of the elements in the figures may be expanded or reduced to help improve the understanding of the embodiments of the present disclosure. Similarly, some components and/or operations may be separated into different blocks or combined into a single block for the purposes of discussion of some of the embodiments of the present disclosure. Moreover, while the disclosure is amenable to various modifications and alternative forms, specific embodiments have been shown by way of example in the drawings and are described in detail below. Some embodiments may include steps or features of other embodiments. The intention, however, is not to limit the disclosure to the particular embodiments described. On the contrary, the disclosure is intended to cover all modifications, equivalents, and alternatives falling within the scope of the disclosure as defined by the appended claims.

DETAILED DESCRIPTION

Various embodiments of the present disclosure generally relate to facilitating purchases. More specifically, various embodiments relate to systems and methods for facilitating purchases. The described systems and methods allow merchants to make offers to a customer or bid for a customer's business, creating a more efficient, less expensive shopping experience for consumers.

In accordance with embodiments of the disclosure, an organization can facilitate a network of merchants that choose to participate in a program to facilitate purchasing such as a reverse auction program. In some cases, the organization may be one of the participating merchants. For each user (e.g., customer) of the program, the organization may receive a wish list and prices indicating what the user is willing to pay for each of the listed items or services on the wish list. With the user's consent, the organization may share the wish list, including the prices, with participating merchants. In some embodiments, the wish list may include time frames in which the user plans to make the purchase (e.g., snow tires in October).

The merchants can extend offers to the user (either directly or via the organization), indicate a price the merchant would be willing to sell the product or services for, accept a price listed by the user, and/or make a new offer that includes additional items that may or may not have been included on the user's wish list. In some embodiments, an offer is made for the entire wish list. Thus, the purchase facilitation program may allow the users to receive the best deal for the items that the user plans to purchase without having to shop around or compare prices. Similarly, the program to facilitate purchases allows merchants to determine the types of purchases to bid on; to gain new, increased traffic to their stores; and/or to potentially sell overstocked merchandise.

In some embodiments, a user's location can be detected by the organization (e.g., through membership activity such as accessing a user account through an ATM or other channel). In some embodiments, the merchants may detect the user's location (e.g., when the merchant uses a point-of-sale device at a particular location). Still yet, mobile applications associated with the mobile device of the user may report the user's current location (e.g., periodically or upon detection of a significant change in the location). Various participating merchants in nearby locations may provide offers for products listed on the user's wish list while the user is in the area, enticing the user to purchase from a particular merchant instead of the competing merchants. In some embodiments, a merchant may offer to sell two or more of the items on the wish list, possibly at a reduced price to the user. The identified location may be an online location (e.g., website).

In some embodiments, the organization may place funds that the user is willing to pay for one or more items on the user's wish list into an escrow account. When a merchant places a bid on or below the amount specified by the user and/or when the user accepts an offer from a merchant, the funds may be released to the merchant, and the transaction may be settled. The merchant may be willing to sell products or services to the user for a lower price because the merchant has an assurance (i.e., the escrow account) that the user will be able to pay for any products or services purchased. In other embodiments, the organization can pre-qualify a user to provide assurances to merchants.

In some embodiments, merchants can gather information from users. For example, merchants may post items the merchants wish to sell and obtain an interest level from users. Users may provide feedback by setting a purchase price for the items posted by the merchants. This may be helpful for merchants selling overstocked items or gauging an interest level from items the merchants are considering purchasing in bulk.

In some embodiments, the user has received offers that the user will accept based on the prices listed in the wish list or on other indications that the user provides. The organization may be aware (e.g., from a user database) that the user does not have adequate funds (e.g., in a user account or an escrow account) at this time to pay for all the items and may provide the user with an offer of a "just-in-time" line of credit, allowing the user to accept the offers or bids using a new line of credit. In some embodiments, the just-in-time LOC may be funded by other users of the organization, providing an investment opportunity to the other users (e.g., the funding user may receive interest) and an opportunity to help a fellow user. In some embodiments, the just-in-time LOC may be funded by both the organization and the other users.

In some embodiments, several or all of the wish lists may be aggregated to identify commonly wished-for items. The organization can negotiate on behalf of the users for lower prices, particularly on the commonly wished-for items, using the number of potential buyers as an incentive to the merchants.

In the following description, for the purposes of explanation, numerous specific details are set forth in order to provide a thorough understanding of embodiments of the present disclosure. It will be apparent, however, to one skilled in the art that embodiments may be practiced without some of these specific details. Moreover, while the disclosure discusses users and/or members of an organization, the concepts disclosed may apply equally to any customers purchasing any type of product and any entity providing or participating in such a program for facilitating purchases.

FIG. 1 illustrates an example of an operating environment 100 in which some embodiments of the present disclosure may be utilized. The embodiments of the present disclosure illustrated in FIG. 1 allow user interactions through various devices such as, but not limited to, dedicated terminal 110 (e.g., public terminal or kiosk), telephone 115, mobile device 120 (e.g., mobile phone), personal computer 125, and image capture device 135. Other devices may include a mobile media device, a mobile gaming device, and a vehicle-based computer. These devices can include mechanisms for interacting with organization 145 through network 140 and may run one or more applications or clients that allow a user to interact with network 140 and organization 145. Such applications may provide access to purchasing facilitator 160 and interfaces that allow the users to communication with organization 145.

In addition, the devices can include network communication components that enable the devices to communicate with network 140 or other electronic devices by transmitting and receiving wireless signals using a licensed, semi-licensed or unlicensed spectrum over network 140. In some cases, network 140 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Network 140 can also include third-party communications networks, such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/

EGPRS)), Enhanced Data rates for GSM Evolution (EDGE), Universal Mobile Telecommunications System (UMTS), or Long Term Evolution (LTE) network, or other communications networks.

Dedicated terminal 110 (e.g., a public terminal, a kiosk, and a fuel dispenser) may be a computer available to the public and/or specially designed kiosks that interact with network 140.

Telephone 115 may be a landline phone. Mobile device 120 may be a cellular phone, smart phone (a smart phone being a cellular phone that has capabilities and features such as, but not limited to, internet access, a full keyboard, email access, Wi-Fi connection capabilities, BLUETOOTH connectivity, or any other functionality of a computer), tablet computer (a portable computer having a touch interface), netbook, or laptop possibly with a wireless connection (such as an 802.11a/b/g connection or mobile broadband connection, such as via a 3G or 4G wireless network).

Personal computer 125 may be any computer (e.g., desktop computers, laptop computers, netbooks, tablet computers, or Internet-enabled television devices) connected to network 140. Image capture device 135 may be any device that is capable of capturing an image or video of, for example, an item a user wishes to purchase.

Image capture device 135 may be capable of capturing the images and thereafter interacting with a computing device for purpose of posting a wish list using the image. The image capture device may be associated with a mobile device 120, a personal computer 125, or other appropriate computing device. In some embodiments, image capture device 135 is included in the mobile device 120 or other device.

Organization 145 may provide financial services to any number of customers or users. The financial services may include banking, investing, insurance, and the like. In other embodiments, organization 145 may be an entity that provides a single financial service such as banking to customers. Organization 145 can use a variety of interaction methods, protocols, and systems to interact with its users.

As illustrated in FIG. 1, organization 145 can be communicably coupled to network 140, purchasing facilitator 160, merchant participants 165, and databases such as user database 150 and wish list database 155. User database 150 may have a variety of information that can be used by the purchasing facilitator 160. For example, user database 150 may include the name, address, age, annual salary, marital status, account information, length of membership, preferences, vehicle information, etc. Wish list database 155 may include user-created wish lists. The wish lists may include a list of items or services that the user desires and a price that the user is willing to pay for each item or service. In some embodiments, the wish list includes an event and a time frame (e.g., nephew's eighth birthday on January 15, nephew lives in Seattle, Wash.), leaving it open to suggestions, recommendations, and offers from the merchants.

In some embodiments, the user database 150 and the wish list database 155 can be integrated into one database. A computer system associated with the organization 145 within network 140 may be able to access these (and other) databases for user information and other stored information.

Purchasing facilitator 160 may use information from the user database 150 and information from the wish list database 155 to manage a program to facilitate purchases. Purchasing facilitator 160 may maintain wish lists of participating users, share the user wish lists with the merchant participants 165, receive and aggregate offers from the merchant participants 165, notify users of the offers, locate the users, set aside funds in escrow accounts for the users, and provide just-in-time line of credit.

Merchant participants 165 are merchants who are participating in the program that facilitates purchasing such as a reverse auction program. Merchant participants 165 may fund the program and pay organization 145 a certain percent of each item a user purchases. Merchant participants 165 may have pre-negotiated contracts with organization 145 regarding user privacy, pricing, and the like. In some embodiments the organization 145 can be included as a participating merchant 165.

Figure 2:
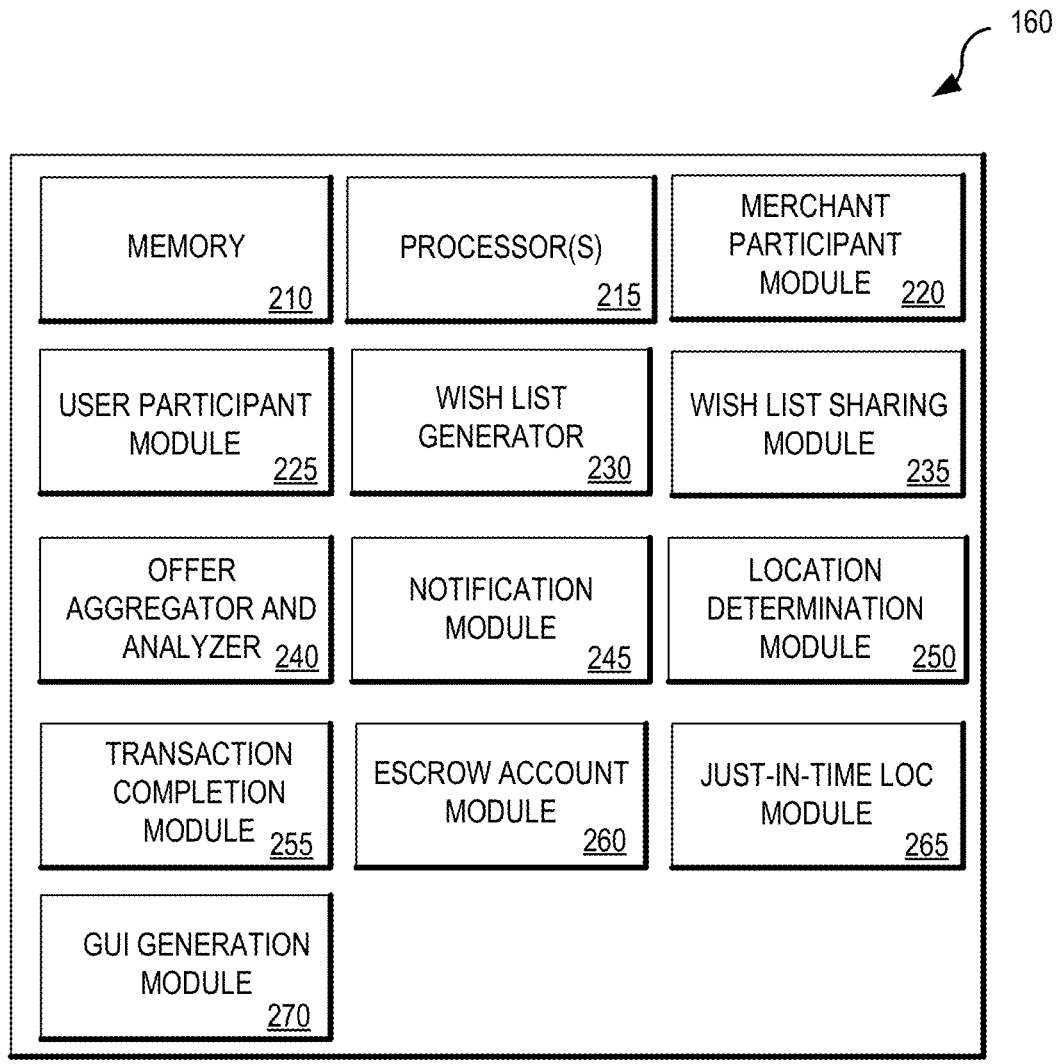
FIG. 2 is a block diagram illustrating examples of components of a purchasing facilitator.

FIG. 2 is a block diagram illustrating components that can be included in a system such as purchasing facilitator 160. According to the embodiments shown in FIG. 2, memory 210, processor(s) 215, merchant participant module 220, user participant module 225, wish list generator 230, wish list sharing module 235, offer aggregator and analyzer 240, notification module 245, location determination module 250, transaction completion module 255, escrow account module 260, just-in-time Line of Credit ("LOC") module 265, and Graphical User Interface ("GUI") generation module 270. Other embodiments of the present disclosure may include some, all, or none of these modules and components along with other modules, applications, and/or components.

The modules and components illustrated in FIG. 2 may be hardware, firmware, software, or a combination. Still yet, some embodiments may incorporate two or more of these modules into a single module and/or associate a portion of the functionality of one or more of these modules with a different module. For example, in one embodiment, the functionality associated with wish list generator 230 and wish list sharing module 235 can be incorporated into a single wish list module. In some embodiments, the transaction completion module 255 can be separated into a purchase price confirmation module to confirm the purchase price, pick-up/delivery module to determine how the item will be provided to the user, and receipt delivery module to generate and send a final receipt to the user.

Memory 210 can be any device, mechanism, or populated data structure used for storing information. In accordance with some embodiments of the present disclosure, memory 210 can encompass any type of, but not limited to, volatile memory, nonvolatile memory and dynamic memory. For example, memory 210 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact disks, DVDs, and/or the like. In accordance with some embodiments, memory 210 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 210.

Memory 210 may be used to store instructions for running one or more applications or modules on processor(s) 220. For example, memory 210 could be used in one or more embodiments to house all or some of the instructions needed to execute the functionality of merchant participant module 220, user participant module 225, wish list generator 230, wish list sharing module 235, offer aggregator and analyzer 240, notification module 245, location determination module 250, transaction completion module 255, escrow account module 260, just-in-time LOC module 265, and/or GUI generation module 270.

Merchant participant module 220 can track and manage merchant participation in the program for facilitating purchases. Merchant participant module 220 may also generate a list of merchants participating in the program and may maintain the list as merchants join or leave. The merchant participant list may be confidential. This list may be presented to users when asking the users if the user would like to join the program for facilitating purchases. Merchants will be able to view wish lists generated by wish list generator 230 and make offers for items on the wish list and/or other items that the user may be interested in purchasing. The participating merchants may be provided an interface or other mechanism to view the offers made by other merchants.

User participant module 225 can maintain a list of participating users. In order to participate in the purchase facilitation program, users may be required to sign a consent agreement to have their wish list and/or location information shared with participating merchants. When registering for the purchase facilitation program, the user may specify preferences for one or more items or retain the default settings. Preferences may include notification preferences (e.g., text message, email, etc.), location tracking preferences, cost calculation preferences, etc. For example, in calculating a total cost to the user, the user may have specified a primary make and model of vehicle for fuel calculations. Additionally, the user may specify a value of their time (e.g., $80/hour). Thus, a traffic jam detected on an intended route costing the user additional time may factor differently into a total cost equation depending on the user's preferences.

Wish list generator 230 can allow users to create a wish list. The wish list may include items or services the user is willing to purchase for a listed price. The wish list may also specify a time of year or date in which the user intends to purchase the item. In some embodiments the users choose items from a catalog to put into their wish list. In other cases, a GUI screen may be presented that allows the user to search and select items and/or services of interest. The items and/or services may be placed by merchants in order to gauge interest levels before investing in the items and/or services themselves or before pricing the items and/or services.

In some embodiments, the items and/or services may be items and/or services commonly offered by the merchants. Still yet, the GUI screen may allow the user to enter descriptive information about items and/or services they would be interested in, both generally and specifically. For example, in some embodiments, a user may be able identify an interest in any 1987 baseball cards. The more general descriptions may allow merchants to present items to users.

Wish list generator 230 may suggest prices or ranges of prices (e.g., MSRP) to users. Wish list generator 230 may further provide an indication of the likelihood the user's selected price may be accepted or found. Users may also receive an estimated wait time to receive a bid (e.g., based on historical bids).

Wish list sharing module 235 can share the wish lists generated by wish list generator 230 with participating merchants. In some embodiments, the user must specify a preference for revealing their identity and/or sharing their wish lists before any information is provided to the participating merchants. Amendments and updates to the list may be pushed to the merchants in real-time, in near real-time, in batches, or on a periodic schedule. In some embodiments, wish list sharing module 235 reviews the wish lists of some, if not all, the users and identifies commonly noted items. Using this information, the organization may bargain on behalf of the users, essentially increasing the buying power of the user.

Offer aggregator and analyzer 240 can receive offers or bids from merchants, aggregate the offers or bids, analyze the offers based on information merchant and user information, and sort the offers or bids by best deal for the user. The offers may indicate a price the merchant would be willing to sell for, accept a price listed by the user, and/or make a new offer that includes additional items that may or may not be on the user's wish list.

Analyzing the offers may include determining a total cost of the offer. The total cost may be based on discount coupons that can be applied to the offer, rewards the user will earn in making the purchase (e.g., reward from using a particular payment instrument associated with the merchant or the organization), location of the user, estimated transportation costs (e.g., fuel economy of vehicle expected to be driven, distance, traffic issues, tolls, etc.), cost of the time it will take the user to make the purchase (e.g., including travel time to the merchant location from a current location and to final destination), shipping costs, etc.

In some embodiments, the offer may be for several items or all the items on the wish list. Offer aggregator and analyzer 240 parses the estimated amount for each item in the offer, including a time savings for purchasing and collecting the items at one location. For each item, the offers may be prioritized by price and/or total cost.

Offer aggregator and analyzer 240 may make transactions from one merchant available for viewing by the other merchants. In some embodiments, the total cost may be provided to other merchants. Merchants may then be forced to determine the lowest price the merchant is willing to offer and provide competing offers. This may be particularly useful for users wishing to purchase higher-priced items, assuring the user that they are receiving the best deal. For example, two dealerships with similar vehicles may be allowed to view communications between the user and the other dealership, allowing the dealership to see the price that the dealership must beat in order to obtain the user's business. In some embodiments, merchants set up business rules such that a bottom price may be offered, but a lower price cannot be offered. The "best deal" for the user may include a calculation of travel time and expenses and/or cost to pick-up or deliver the item, sales tax, and/or any other preferences or costs the user has specified. Cost of travel to the merchant may be based on the user's current location or a specified location. Offer aggregator and analyzer 240 may provide the assessment and total cost to notification module 245.

Notification module 245 notifies the user that one or more offers have been received. Notification module 245 may provide the offer and a total cost of the offer to the user based on the calculations determined by offer aggregator and analyzer 240. The notification may be made in any manner such as SMS messaging, an email, a phone message, a message posted on an account of the user, and the like. The merchant may be notified if the user accepts, rejects, or counteroffers an offer placed by a user. In some embodiments, notification module 245 may notify the user of an offer based on the user's location.

The estimated total cost calculations may be helpful to the user in the decision-making process. For example, if the user is currently shopping at a first merchant, the user may locate an item on the user's wish list. The user may be notified that the same item is available for $15 less at a second merchant that is fifteen miles away. The total cost calculation may include a price of the item at the second merchant and the fuel cost and wear and tear of the user's vehicle in traveling to the second merchant. The total cost of purchasing the item from the second merchant may actually be more than the cost of purchasing the time from the first merchant when the fuel costs and other costs are calculated to determine the total cost. The notification module 245 may include cost comparisons.

Location determination module 250 determines a location of the user. The location may be determined by any method known in the art (e.g., cell phone triangulation and geofencing). In some embodiments, the user may receive offers based on the user's location. For example, the merchants may receive notification that the user is near the merchant location and make an offer. In some embodiments, the merchant may attempt to entice a user who is currently shopping in a competitor's location to purchase from the merchant by making an offer to the user.

Transaction completion module 255 may complete a transaction. Completing a transaction may include receiving an acceptance of an offer from a user, confirming the acceptance, sending a notification to the merchant making the offer via the notification module 245, releasing funds from escrow to the merchant, sending a receipt to the user, scheduling pick up or delivery times, and settling the payment.

Escrow account module 260 may provide an escrow account to a use and receive funds equal to the amount of money the user is willing to pay for one or more items listed on their wish list. In some embodiments, when a merchant has offered a price at or below the user's escrowed amount and/or when the user accepts the offer, the escrow account module 260 may release the funds to the merchant. Information regarding the wish list, including prices, may be provided to the escrow account module 260. Notification module 245 may notify the user after the escrow account module 260 indicates that the funds have been released to a merchant.

Just-in-time LOC module 265 can detect that the user does not have sufficient funds to accept an offer from a merchant and may offer a line of credit to a user after the offer has been received, allowing the user to complete the purchase. In some embodiments, just-in-time LOC module 265 may offer a line of credit even if the user has sufficient funds to accept an offer.

GUI generation module 270 can generate one or more GUI screens that allow for interaction between the users, the organization, and the merchants. In at least one embodiment, GUI generation module 270 generates a GUI allowing a user to generate wish lists, receive bids, accept bids, set preferences, and/or otherwise receive or convey information to the user. GUI generation module 270 may also display received information from the merchants (e.g., offers) and convey information to the merchants (e.g., the wish lists, current offers for items on the wish list).

Figure 3:
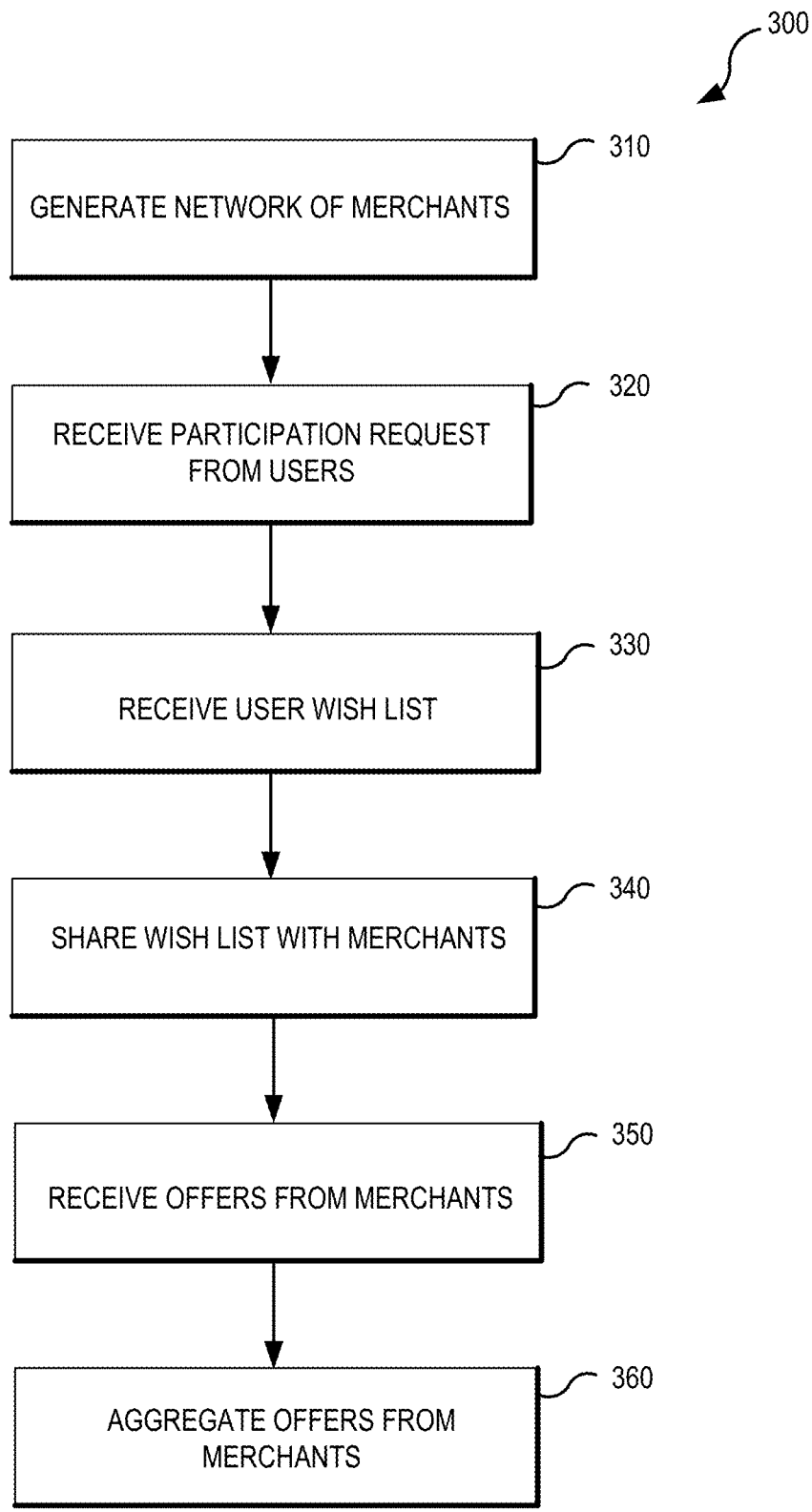
FIG. 3 is a flowchart illustrating an example set of operations for operating a purchasing facilitator in accordance with various embodiments of the present disclosure.

FIG. 3 is a flow chart illustrating an example set of operations 300 for operating a purchasing facilitator such as a reverse auction system in accordance with various embodiments of the present disclosure. The operations can be performed by various components such as processor(s) 215, merchant participant module 220, user participant module 225, wish list generator 230, wish list sharing module 235, offer aggregator and analyzer 240, notification module 245, location determination module 250, transaction completion module 255, and other modules/components.

In merchant network generation operation 310, a network of merchants participating in a purchase facilitation program is compiled. In some embodiments, the participating merchants are participating in a program with users of organization 145.

The users or customers of organization 145 may be enrolled in the purchase facilitation program after making an enrollment request through user participation request operation 320. The user can make the request in a manner convenient for the user (e.g., phone, mobile application, web portal and SMS messaging). After enrolling the program, the users can generate a wish list and provide the list to organization 145 in wish list receiving operation 330. The wish list may be generated by the user selecting items from a catalog, selecting items from a list, keying in items, sending pictures of items, etc.

In wish list sharing operation 340, the wish lists received from wish list receiving operation 330 are shared with the network of merchants. Depending upon the privacy preferences of the user, other information related to the user may be shared with the merchants, such as the user's preferences for communication, shopping, rewards, etc. In offer receiving operation 350, organization 145 may receive the offers on the user's wish list items from merchants. In some embodiments, the offers are sent directly to the user. The offers may include a bid price for the item or several items on the user's wish list. For example, the price of a particular item may be lower when it is bundled with another item on the wish list.

Aggregation operation 360 aggregates and sorts the offers from the merchants and sends the information to the user. Thereafter, the user may choose to accept an offer from one of the merchants. If the user accepts an offer, then the wish list may be automatically updated to reflect the purchase.

Figure 4:
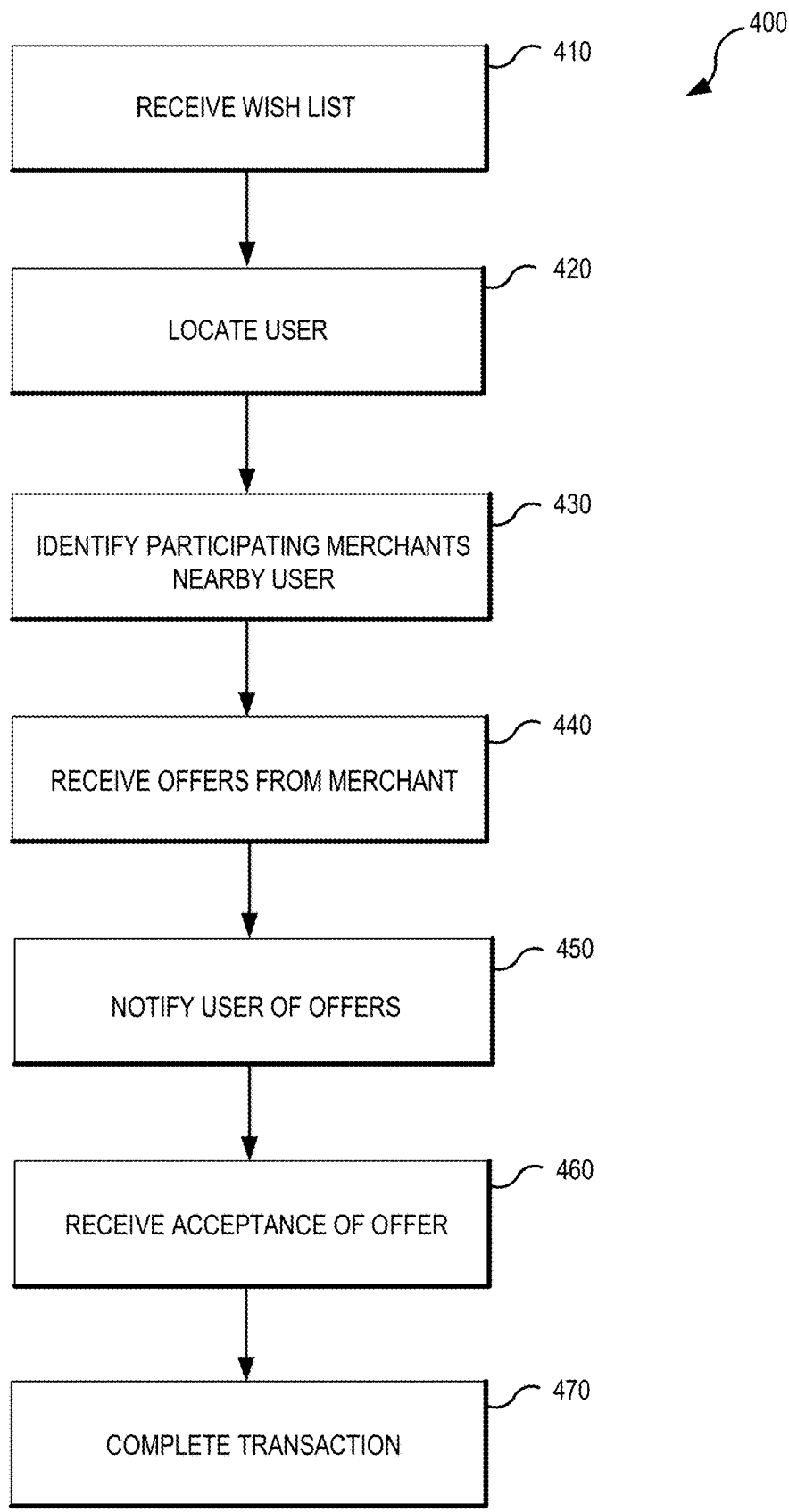
FIG. 4 is a flowchart illustrating an example set of operations for operating a purchasing facilitator in accordance with various embodiments of the present disclosure.

FIG. 4 is a flowchart illustrating an example set of operations 400 for operating a purchasing facilitator in accordance with various embodiments of the present disclosure. The operations can be performed by various components such as processor(s) 215, merchant participant module 220, user participant module 225, wish list generator 230, wish list sharing module 235, offer aggregator and analyzer 240, notification module 245, location determination module 250, transaction completion module 255, and other modules/components.

Wish list receiving operation 410 receives a wish list from a user participating in a purchase facilitation program. The wish list may include items the user wishes to purchase and may further include prices the user is willing to pay for one or more items on the wish list. In location operation 420, a participating user is located. In an example, a user may be using a mobile application associated with the organization or the purchase facilitation program, and the user's location may be identified by the organization and/or the participating merchants. Geofencing may also be used to indicate a location of a user, alerting a merchant or the organization that a user with a particular wish list is within the geofenced area.

Based on the location information collected in location operation 420, identification operation 430 identifies participating merchants within a predetermined distance of the user. Identification operation 430 may further notify the participating merchants that the user is within an identified distance from the merchant. Offer receiving operation 440 may receive one or more offers from one or more merchants. Notification operation 450 notifies the user of any offers. Accepting operation 460 receives acceptance of an offer from the user. The offer may be accepted using a one-click operation from the user on the user's smartphone, for example. After acceptance of an offer, complete transaction operation 470 completes the transaction. Completing the transaction may include determining details of delivery, payment, and an exchange of any additional information. Complete transaction operation may further include removing the purchased item from the user's wish list.

Figure 5:
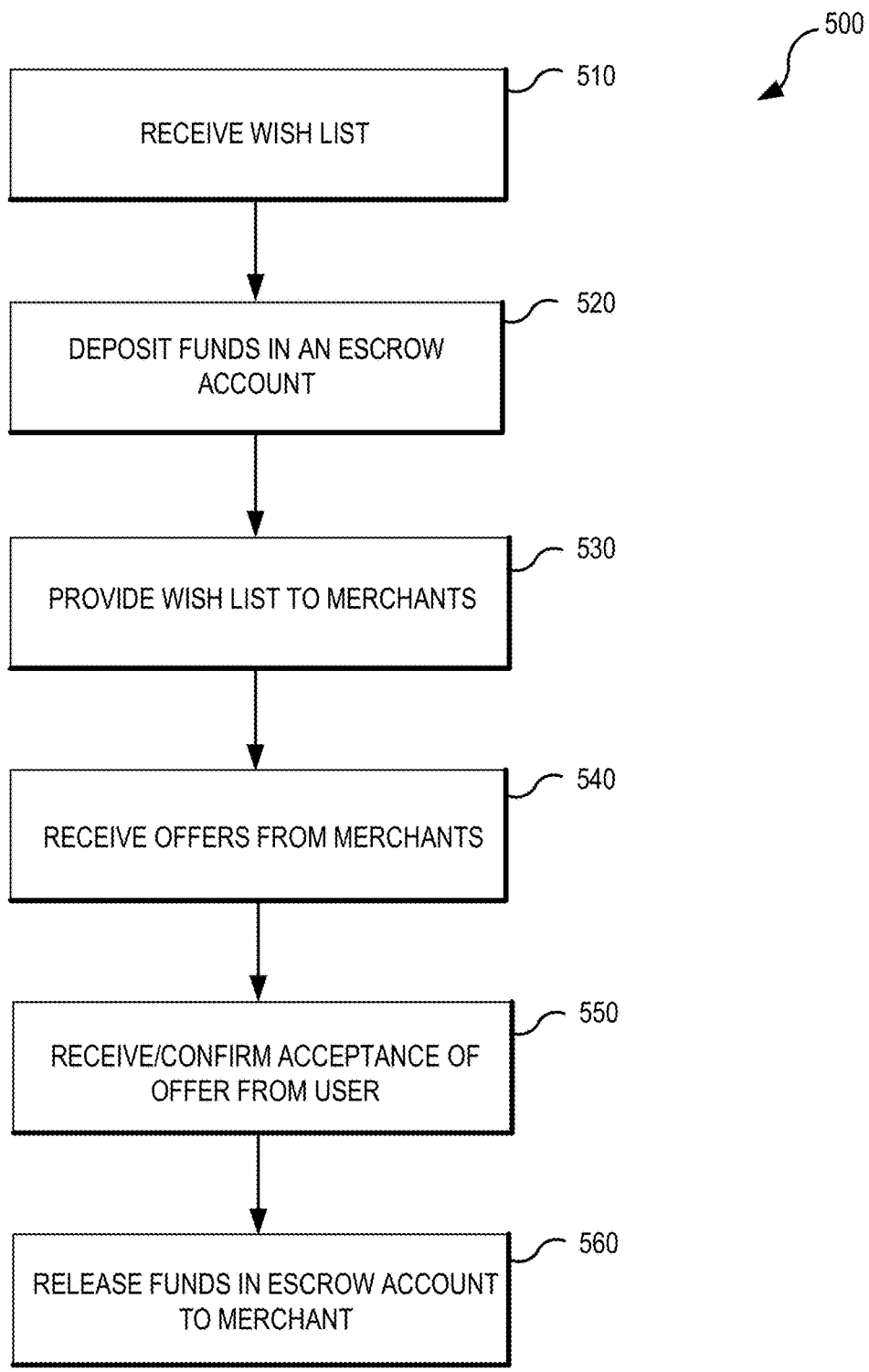
FIG. 5 is a flowchart illustrating an example set of operations for operating a purchasing facilitator in accordance with various embodiments of the present disclosure.

FIG. 5 is a flowchart illustrating an example set of operations 500 for operating a purchasing facilitator in accordance with various embodiments of the present disclosure. The operations can be performed by various components such as processor(s) 215, merchant participant module 220, user participant module 225, wish list generator 230, wish list sharing module 235, offer aggregator and analyzer 240, notification module 245, location determination module 250, transaction completion module 255, escrow account module 260, just-in-time LOC module 265, and other modules/components.

Wish list receiving operation 510 receives or accesses a wish list created by a user that may be stored in the wish list database. The wish list may include items the user wishes to purchase and may further include prices the user is willing to pay for one or more items on the wish list. Funds depositing operation 520 deposits user's funds for items in a wish list in an escrow account. The amount of the funds may be equal to an amount the user is willing to pay for the items or services specified on the user's wish list. In some embodiments, the user may deposit an amount less than the total amount the user is willing to pay for all the items and may further indicate a priority of which items or services the funds are reserved for.

Wish list providing operation 530 provides a user wish list to the merchants participating in the purchase facilitation program. Based on the wish list, merchants may provide bids or make offers that meet or exceed the deal that the user specified in the wish list in receiving operation 540. The user accepts or confirms acceptance of an offer in accepting operation 550. In some embodiments, the user automatically accepts an offer that meets the user's specified price point for that item or service. In other embodiments, the user evaluates the offers and even makes a counteroffer. Upon receipt of confirmation that the user wishes to make a purchase for a wish list item from a participating merchant, release funds operation 560 releases funds to the chosen merchant to complete the purchase for the user.

Figure 6:
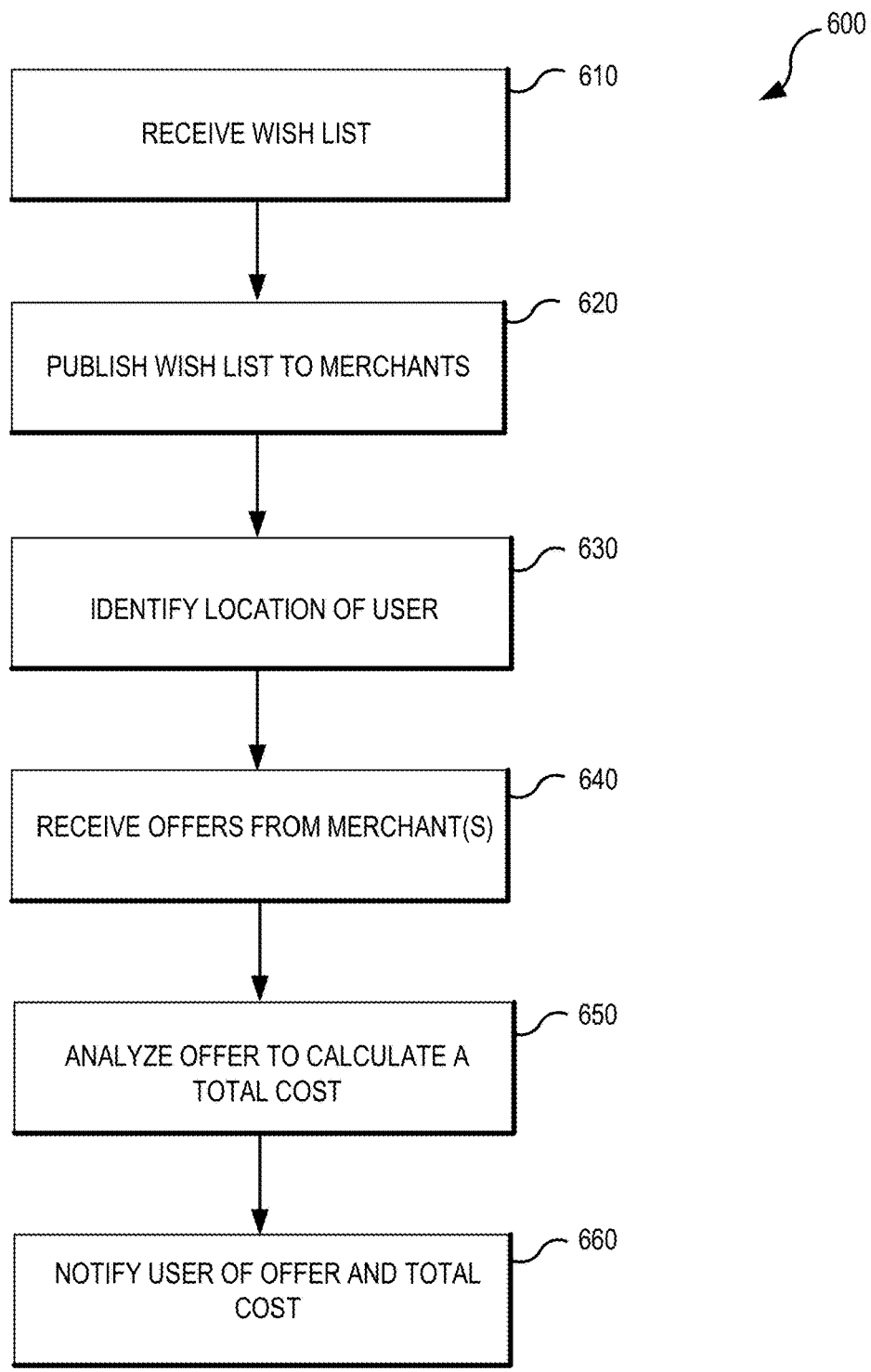
FIG. 6 is a flowchart illustrating an example set of operations for operating a purchasing facilitator in accordance with various embodiments of the present disclosure.

FIG. 6 is a flowchart illustrating an example set of operations 600 for operating a purchasing facilitator in accordance with various embodiments of the present disclosure. The operations can be performed by various components such as processor(s) 215, merchant participant module 220, user participant module 225, wish list generator 230, wish list sharing module 235, offer aggregator and analyzer 240, notification module 245, location determination module 250, transaction completion module 255, and other modules/components.

Receiving operation 610 receives a wish list from a user. Publishing operation 620 publishes the wish list to merchants who are participating in a purchase facilitation program. The wish list may be published on a web portal accessible to the merchant participants. In some embodiments, alerts are sent to the merchants with user updates to the wish list.

Identifying operation 630 identifies a location of the user. Identifying may include detecting, tracking, determining, and/or receiving the location of the user. The user may be identified using any technique known in the art. For example, the user may be located using GPS location using the user's mobile device. In some embodiments, the user may be located using geofencing techniques. In some embodiments, the user's location is detected, tracked, determined, and/or identified by the user organization. If permission is given, the organization may share the user's location information with one or more of the merchants. In other embodiments, the participating merchants identify the user's location.

After the user's location is identified, receiving operation 640 receives offers for one or more items or services on the user's wish list based on the user's location. The offers may be based on the user's proximity to the merchant or the merchant's competitors. For example, if the user's wish list includes a barbeque and the organization (or merchant) determines that the user is at or within a proximity of a competitor of the merchant that also sells barbeques, then the merchant may make a competing offer to the user. The offer may propose to sell the barbeque at a lower price than the competitor's current offer and may also include additional perks such as free shipment to the user's doorstep.

The offer may include an offer to sell a few or all of the items on the user's wish list for a certain price. In some embodiments, the offer may include one or more items that are not on the wish list but that are gleaned from the organization's or merchant's understanding of the user's needs (e.g., mother's day is coming up so the offer includes an offer to send flowers to user's mother). This information may be determined from the user's historical behavior (e.g., credit card transactions), calendar, or information from a friend or family member of the user.

Analyzing operation 650 analyzes the offer to calculate a total cost to the user of the offer. Factors that may be included in the calculation are the price of the item and a cost to obtain the items. A cost to obtain the items may include a cost of traveling to pick up the item from a current location of a user or a specified location. The cost of traveling may include an estimated cost of fuel to travel to the merchant and a cost associated with wear and tear on the vehicle used to travel to the merchant. The costs may be estimated by using the make and model of the vehicle that the user drives or specifies. The user may also specify that the item will be picked up using public transportation.

In some embodiments, the user may choose to have the item shipped or delivered to a specified location. Instead of calculating the cost to travel to pick up the item, a cost of shipping may be calculated or received from the merchant or shipping company. The total cost may also include a cost of time to the user (e.g., a monetary conversion of time needed to complete the transaction that may be particular to the user).

Notifying operation 660 notifies the user of the one or more offers and the total cost. The notification may be received via text message, push notification, mobile application, email, voice call, or the like. In some embodiments, the user may select an option to "ACCEPT OFFER" to lock in the deal and complete the purchase. Some offers may be time-limited (e.g., the user has 30 minutes to accept the offer).

Figure 7:
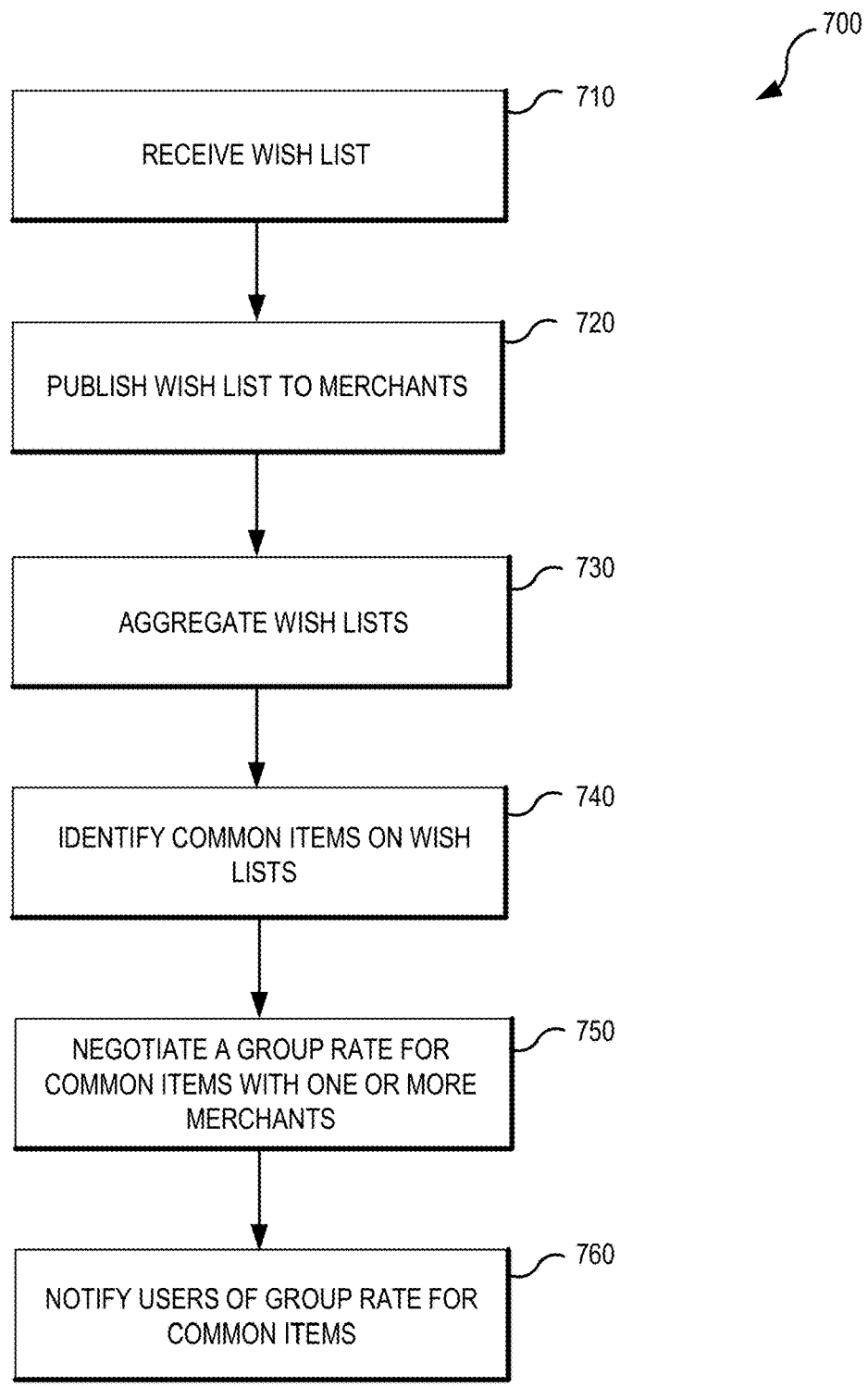
FIG. 7 is a flowchart illustrating an example set of operations for operating a purchasing facilitator in accordance with various embodiments of the present disclosure.

FIG. 7 is a flowchart illustrating an example set of operations 700 for operating a purchasing facilitator in accordance with various embodiments of the present disclosure. The operations can be performed by various components such as processor(s) 215, merchant participant module 220, user participant module 225, wish list generator 230, wish list sharing module 235, offer aggregator and analyzer 240, notification module 245, location determination module 250, transaction completion module 255, and other modules/components.

Receiving operation 710 receives one or more wish lists from one or more users. Publishing operation 720 publishes the wish lists, making the wish lists accessible to merchants who are participating in a purchase facilitation program. Aggregating operation 730 aggregates the user wish lists to assist with identification of items that appear on more than one wish list. Items or services that appear on more than one list are identified in identifying operation 740. Negotiating operation 750 negotiates a group rate with one or more merchants for at least some of the commonly listed items. For example, if a group of users include tires on their wish lists, the organization may negotiate a special rate on tires with a merchant. Notifying operation 760 may notify the users who included the common item in their wish list of the group rate and the merchant offering the group rate. In some embodiments, notifying operation notifies other users who did not include tires on their wish list.

In some embodiments, the common item(s) are automatically purchased if the purchase price or total cost is below a specified amount indicated on the user's wish list. Total cost may include shipping costs, time costs, mileage, sales tax. Using a total cost instead of the purchase price as a comparison to the user's specified amount may be particularly helpful where the discount merchant is located in a different city or state than the user and shipping costs or other costs may substantially increase the total cost to the user.

Figure 8:
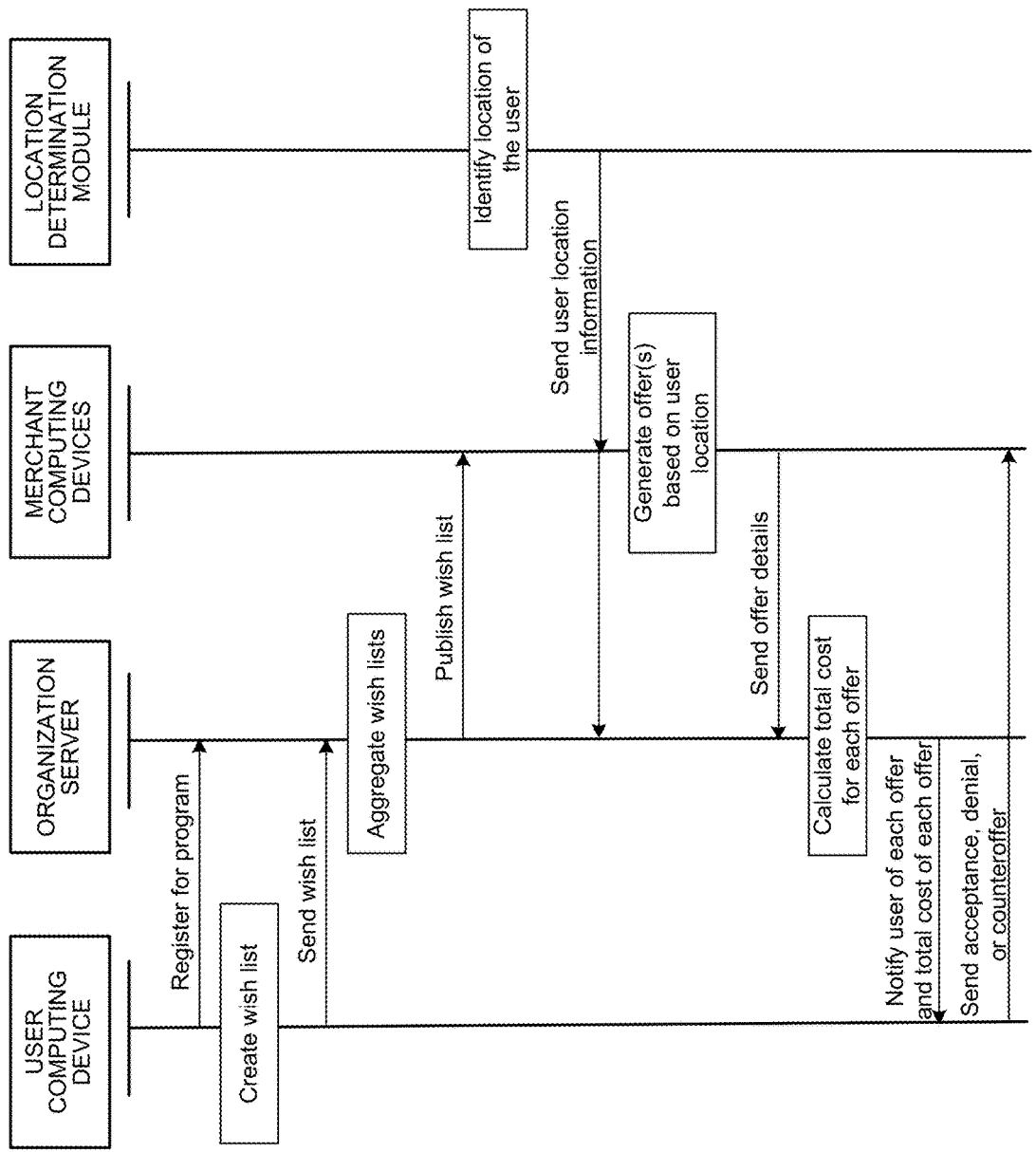
FIG. 8 is a sequence diagram illustrating communications between various components of a purchasing facilitator in accordance with various embodiments of the present disclosure.

FIG. 8 is a sequence diagram illustrating communications between various components of a purchasing facilitator in accordance with various embodiments of the present disclosure. The user computing device may send a registration request and registration information to the organization server. Registration may include information about the user (e.g., interests, age, etc.) and a form of payment information. A wish list may be created on the user computing device and sent to the organization server. The wish list may include a price and/or a total cost the user is willing to pay for each item.

The organization server may aggregate the wish lists and identify common items or services on the wish lists. The wish lists and the common items may be compiled and made accessible to participating merchants via merchant computing devices.

A location determination module may identify the location of the user. The location determination module may communicate the user location information to the merchant computing devices and/or the organization server. One or more of the merchants via the merchant computing devices may generate offers based at least in part on the user's location. For example, a merchant may detect that the user is physically located a block from the merchant or perusing in the merchant's store. The merchant may decrease the price of the item or service to entice the user to make a purchase. In some embodiments, the merchant may include additional wish list items as part of an offer.

The offers may be sent from the merchant computing devices to the organization server. The organization server may analyze the information and calculate or estimate a total cost of the item or service to the user. Information such as the user's location, the location of the merchant, the user's destination, a cost of the user's time, fuel costs, sales tax, etc. may be factored into the calculation. The user may be notified of the offers and total costs. The user may communicate with either the organization or the merchant to accept, deny, or provide a counteroffer. In some embodiments, the merchants are provided with the total cost information for their offer, and/or the other offers and corresponding total cost information for the other offers.

In other embodiments, a subscriber service may provide a forum for users to post items and services that the user wants to sell, as well as items and services that users want to purchase. The service may be based on a location of the subscribers. Thus, looking to purchase within a predetermined distance, a subscriber may locate items being sold by other subscribers. The subscriber may facilitate the purchasing or selling effort by taking pictures of items the subscriber wants to sell or purchase. The subscribing service may organize the items and alert shoppers and sellers that these items are available for purchase or sale. The buyers and sellers in this embodiment may be non-commercial entities.

Computer System Overview

Figure 9:
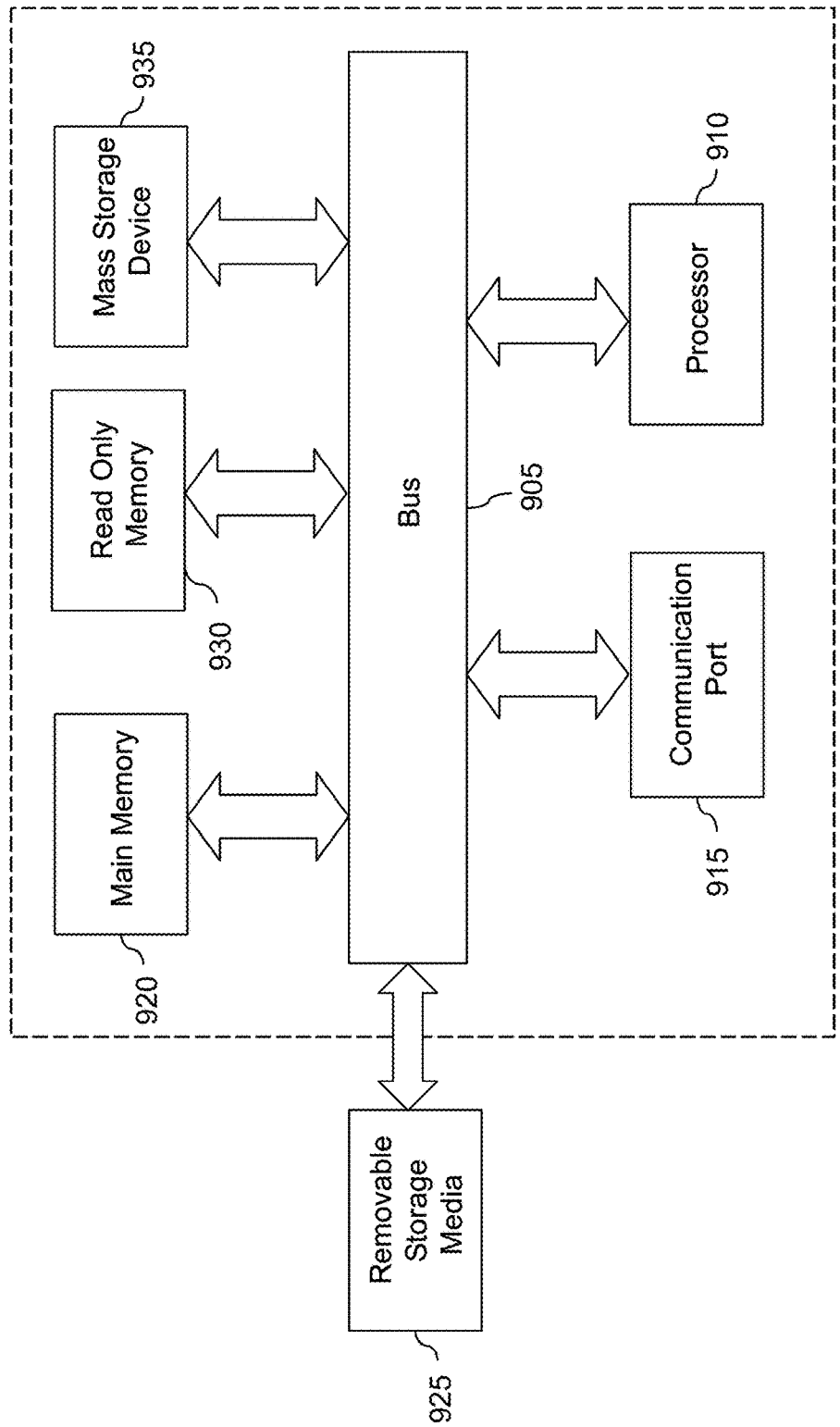
FIG. 9 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 9 is an example of a computer system 900 with which embodiments of the present disclosure may be utilized. According to the present example, the computer system includes a bus 905, at least one processor 910, at least one communication port 915, a main memory 920, a removable storage media 925, a read only memory 930, and a mass storage device 935.

Processor(s) 910 can be any known processor, such as, but not limited to, an Intel® Itanium® or Itanium 2® processor(s), or AMD® Opteron® or Athlon MP® processor(s), or Motorola® lines of processors. Communication port(s) 915 can be any of an RS-232 port for use with a modem based dialup connection, a 10/100 Ethernet port, or a Gigabit port using copper or fiber. Communication port(s) 915 may be chosen depending on a network such a Local Area Network (LAN), Wide Area Network (WAN), or any network to which the computer system 900 connects.

Main memory 920 can be Random Access Memory (RAM), or any other dynamic storage device(s) commonly known in the art. Read only memory 930 can be any static storage device(s) such as Programmable Read Only Memory (PROM) chips for storing static information such as instructions for processor 910.

Mass storage device 935 can be used to store information and instructions. For example, hard disks such as the Adaptec® family of SCSI drives, an optical disc, an array of disks such as RAID, such as the Adaptec family of RAID drives, or any other mass storage devices may be used.

Bus 905 communicatively couples processor(s) 910 with the other memory, storage and communication blocks. Bus 905 can be a PCI/PCI-X or SCSI based system bus depending on the storage devices used.

Removable storage media 925 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

The components described above are meant to exemplify some types of possibilities. In no way should the aforementioned examples limit the scope of the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may", "can", "could", or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Embodiments of the present disclosure may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present disclosure may also be downloaded as a computer program product, wherein the program may be transferred from a remote computer to a requesting computer by way of data signals embodied in a carrier wave or other propagation medium via a communication link (e.g., a modem or network connection).

Also, for the sake of illustration, various embodiments of the present disclosure have herein been described in the context of computer programs, physical components, and logical interactions within modern computer networks. Importantly, while these embodiments describe various aspects of the disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods and arrangements for facilitating purchases. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as they fall within the scope of the claims, together with all equivalents thereof. Therefore, the above description should not be taken as limiting the scope of the disclosure.

What is claimed is:

1. A method, comprising:
publishing, by a purchasing facilitator platform, one or more items or services indicated by a user to one or more merchants participating in a reverse auction program, wherein the purchasing facilitator platform includes at least one processor,
wherein the purchasing facilitator platform interacts with at least one device associated with the one or more merchants and a user device associated with the user;
determining a user location of the user based on a device location of the user device;
receiving, from the at least one device associated with the one or more merchants, one or more offers for the one or more items or services based on a merchant location being within a proximity of the user location;
determining, by the purchasing facilitator platform, a total cost of each of the one or more offers to the user;
sending, to the user device, the one or more offers and the total cost of each of the one or more offers;
determining, by the purchasing facilitator platform, the user does not have funds to accept the one or more offers; and in response to determining the user does not have funds, sending, to the user device, an offer for a line of credit to pay for all or a portion of the total cost of the one or more items or services.

2. The method of claim 1, wherein the line of credit is funded by at least one participant of the reverse auction program or an organization that operates the reverse auction program.

3. The method of claim 2, wherein, in response to the user accepting the offer for the line of credit, the at least one participant or the organization that offers the line of credit receives interest on the line of credit.

4. The method of claim 1, further comprising:
depositing funds into an escrow account for the user; and
in response to determining that the escrow account has insufficient funds compared to the total cost of the one or more offers, sending the user the offer for the line of credit.

5. The method of claim 1, wherein determining, by the reverse auction program, the total cost comprises calculating transportation costs for the user to obtain the one or more items or services based on a location of the user.

6. The method of claim 1, further comprising:
determining the total cost of each of the one or more offers by calculating shipping costs or driving costs for the user to obtain the one or more items or services based on the user location of the user, wherein the one or more offers is based at least in part on the user location of the user.

7. The method of claim 1, further comprising:
publishing an event and a time frame indicated by the user to the one or more merchants participating in the reverse auction program; and
receiving, from the one or more merchants, one or more second offers for a suggestion or recommendation associated with the event and the time frame.

8. A non-transitory, computer-readable medium comprising non-transitory computer-readable instructions which, when executed by one or more processors of a purchasing facilitator platform, direct the one or more processors to:
publish one or more items or services indicated by a user to one or more merchants participating in a reverse auction program,
wherein the purchasing facilitator platform interacts with at least one device associated with the one or more merchants and a user device associated with the user;
determine a user location of the user based on a device location of the user device;
receive, from the at least one device associated with the one or more merchants, one or more offers for the one or more items or services based on a merchant location being within a proximity of the user location;
determine a total cost of each of the one or more offers to the user;
send, to the user device, the one or more offers and the total cost of each of the one or more offers;
determine the user does not have funds to accept the one or more offers; and
in response to determining the user does not have funds, send, to the user device, an offer for a line of credit to pay for all or a portion of the total cost of the one or more items or services.

9. The non-transitory, computer-readable medium of claim 8, wherein the line of credit is funded by at least one participant of the reverse auction program or an organization that operates the reverse auction program.

10. The non-transitory, computer-readable medium of claim 9, wherein, in response to the user accepting the offer for the line of credit, the at least one participant or the organization that offers the line of credit receives interest on the line of credit.

11. The non-transitory, computer-readable medium of claim 8, wherein the instructions, when executed by the one or more processors, further direct the one or more processors to:
deposit funds into an escrow account for the user; and
in response to determining that the escrow account has insufficient funds compared to the total cost of the one or more offers, send the user the offer for the line of credit.

12. The non-transitory, computer-readable medium of claim 8, wherein the instructions, when executed by the one or more processors, further direct the one or more processors to calculate transportation costs for the user to obtain the one or more items or services based on a location of the user, wherein the total cost includes the transportation costs.

13. The non-transitory, computer-readable medium of claim 8, wherein the instructions, when executed by the one or more processors, further direct the one or more processors to:
determine the total cost of each of the one or more offers by calculating shipping costs or driving costs for the user to obtain the one or more items or services based on the user location of the user, wherein the one or more offers is based at least in part on the user location of the user.

14. The non-transitory, computer-readable medium of claim 8, wherein the instructions, when executed by the one or more processors, further direct the one or more processors to:
publish an event and a time frame indicated by the user to the one or more merchants participating in the reverse auction program; and
receive, from the one or more merchants, one or more second offers for a suggestion or recommendation associated with the event and the time frame.

15. A system, comprising:
one or more processors of a purchasing facilitator platform; and
one or more memories storing instructions that, when executed by the one or more processors, cause the system to perform a process comprising:
publishing one or more items or services indicated by a user to one or more merchants participating in a reverse auction program,
wherein the purchasing facilitator platform interacts with at least one device associated with the one or more merchants and a user device associated with the user;
determining a user location of the user based on a device location of the user device;
receiving, from the at least one device associated with the one or more merchants, one or more offers for the one or more items or services based on a merchant location being within a proximity of the user location;
determining a total cost of each of the one or more offers to the user;
sending, to the user device, the one or more offers and the total cost of each of the one or more offers;
determining the user does not have funds to accept the one or more offers; and in response to determining the user does not have funds, sending, to the user device, an offer for a line of credit to pay for all or a portion of the total cost of the one or more items or services.

16. The system of claim 15, wherein the line of credit is funded by at least one participant of the reverse auction program or an organization that operates the reverse auction program.

17. The system of claim 16, wherein, in response to the user accepting the offer for the line of credit, the at least one participant or the organization that offers the line of credit receives interest on the line of credit.

18. The system of claim 15, wherein the process further comprises:
   depositing funds into an escrow account for the user; and
   in response to determining that the escrow account has insufficient funds compared to the total cost of the one or more offers, sending the user the offer for the line of credit.

19. The system of claim 15, wherein the process further comprises:
   calculating transportation costs for the user to obtain the one or more items or services based on a location of the user, wherein the total cost includes the transportation costs.

20. The system of claim 15, wherein the process further comprises:
   determining the total cost of each of the one or more offers by calculating shipping costs or driving costs for the user to obtain the one or more items or services based on the user location of the user, wherein the one or more offers is based at least in part on the user location of the user.

* * * * *